(12) United States Patent
Boggs (10) Patent No.: US 11,787,456 B2
(45) Date of Patent: Oct. 17, 2023

(54) DOLLY ASSEMBLIES INCLUDING LOCKING ASSEMBLIES FOR LOCKING CHILD DOLLY CAROUSELS

(71) Applicant: Toyota Motor Engineering & Manufacturing North America, Inc., Plano, TX (US)

(72) Inventor: Ethan R. Boggs, Georgetown, KY (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 230 days.

(21) Appl. No.: 17/330,830

(22) Filed: May 26, 2021

(65) Prior Publication Data

US 2022/0379942 A1 Dec. 1, 2022

(51) Int. Cl.
| | |
|---|---|
| B62B 3/16 | (2006.01) |
| B62B 3/00 | (2006.01) |
| B62B 3/02 | (2006.01) |
| B62B 5/00 | (2006.01) |

(52) U.S. Cl.
CPC ............... B62B 3/16 (2013.01); B62B 3/005 (2013.01); B62B 3/02 (2013.01); B62B 5/0026 (2013.01); *B62B 2203/071* (2013.01); *B62B 2203/60* (2013.01); *B62B 2207/00* (2013.01); *B62B 2301/044* (2013.01)

(58) Field of Classification Search
CPC .. B62B 3/16; B62B 3/005; B62B 3/02; B62B 5/0026; B62B 2203/071; B62B 2203/60; B62B 2207/00; B62B 2301/044
See application file for complete search history.

(56) References Cited

U.S. PATENT DOCUMENTS

| | | | | |
|---|---|---|---|---|
| 3,830,385 A * | 8/1974 | Young | ................... | B62D 13/04 414/536 |
| 8,763,488 B2 | 7/2014 | Reekers | | |
| 10,093,334 B1 * | 10/2018 | Brown | ................... | B62B 3/005 |
| 2005/0079039 A1 * | 4/2005 | Neumann | ................. | B62B 3/04 414/529 |
| 2005/0226708 A1 * | 10/2005 | Brown | ................... | B62B 3/008 414/482 |
| 2011/0068547 A1 * | 3/2011 | Mead | ........................ | B62B 3/14 280/33.992 |
| 2012/0068395 A1 * | 3/2012 | Daeschner | ............... | B25H 1/08 29/559 |
| 2015/0225007 A1 * | 8/2015 | Knepp | ................... | B62D 63/06 280/47.18 |

(Continued)

FOREIGN PATENT DOCUMENTS

| | | |
|---|---|---|
| CN | 205343042 U | 6/2016 |
| CN | 108045416 A * | 5/2018 |

(Continued)

*Primary Examiner* — James A Shriver, II
*Assistant Examiner* — Ian Bryce Shelton
(74) *Attorney, Agent, or Firm* — Dinsmore & Shohl LLP (57) ABSTRACT

A dolly assembly includes a parent dolly including a support frame that defines a truck-receiving volume. A child dolly includes a support frame that is sized to be received within the truck-receiving volume. The child dolly includes a child dolly carousel. The parent dolly and the child dolly together include a locking assembly including a locking arm that prevents rotation of the child dolly carousel in a locked position.

16 Claims, 5 Drawing Sheets

(56) References Cited

U.S. PATENT DOCUMENTS

2017/0282949 A1\* 10/2017 Gonzalez ................ B62B 3/005
2018/0147716 A1\* 5/2018 Gang ..................... B25H 3/028
2022/0063693 A1\* 3/2022 Richardson ........... B62B 3/1404

FOREIGN PATENT DOCUMENTS

| CN | 207809120 U | | 9/2018 |
| --- | --- | --- | --- |
| CN | 208521395 U | | 2/2019 |
| CN | 212954036 U | | 4/2021 |
| DE | 102008056591 A1 | \* | 5/2010 |
| DE | 102013008242 A1 | \* | 11/2014 |
| EP | 1736724 A1 | \* | 12/2006 |
| FR | 2955823 A1 | \* | 8/2011 |
| FR | 2993229 A3 | \* | 1/2014 |
| KR | 200147474 Y1 | \* | 6/1999 |

\* cited by examiner

DOLLY ASSEMBLIES INCLUDING LOCKING ASSEMBLIES FOR LOCKING CHILD DOLLY CAROUSELS

TECHNICAL FIELD

The present specification generally relates to dolly assemblies and, more particularly to dolly assemblies that include locking assemblies that lock child dolly carousels.

BACKGROUND

Dollies come in a variety of shapes and sizes. One of the most common dolly configurations is a generally L-shaped dolly with vertically extending handles, a base platform and wheels at opposite sides of the base platform. Objects may be seated on the base platform and lifted off the ground by tilting the handles backward toward the operator, acting as a lever. The dolly may then be pulled or pushed around with the center of gravity of the objects over the wheels.

It is known to connect dollies together in a parent/child configuration. Typically, the parent dolly provides an area that is large enough to receive the child dolly. The parent dolly is then used to move the child dolly around because the child dolly may be more difficult to maneuver alone, particularly when loaded with parts. In some cases, the child dolly may have a moveable platform, such as a carousel, that can move relative to a frame of the child dolly.

Accordingly, what is needed is a locking assembly that can be used to lock the carousel when the child dolly is separated from the parent dolly.

SUMMARY

In one embodiment, a dolly assembly includes a parent dolly including a support frame that defines a truck-receiving volume. A child dolly includes a support frame that is sized to be received within the truck-receiving volume. The child dolly includes a child dolly carousel. The parent dolly and the child dolly together include a locking assembly including a locking arm that prevents rotation of the child dolly carousel in a locked position.

In another embodiment, a method of preventing rotation of a child dolly carousel of a child dolly using a locking assembly is provided. The method includes moving the child dolly out of a truck receiving volume of a parent dolly. As the child dolly is being removed from the truck-receiving volume, a locking arm of a locking assembly automatically engages the child dolly carousel thereby preventing rotation of the child dolly carousel while the child dolly is removed from the truck-receiving volume.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein relate to dolly assemblies that include a parent dolly and a child dolly. The parent dolly and the child dolly together include a locking assembly that comprises a locking arm mounted to the child dolly and a ramp mounted to the parent dolly. The locking arm is rotatably mounted to a support frame of the child dolly and includes a contact portion and an interlock portion. A pivot location of the locking arm is located between the contact portion and the interlock portion. The contact portion of the locking arm engages the ramp of the parent dolly to move the interlocking portion from a locked position to an unlocked position. In the unlocked position, the interlock portion of the locking arm disengages a child dolly carousel to allow the child dolly carousel to rotate. The contact portion of the locking arm is biased downward by gravity toward the locked position such that movement of the child dolly away from the ramp moves the interlock portion of the locking arm from the unlocked position to the locked position. In the locked position, the interlock portion of the locking arm engages the child dolly carousel and prevents the child dolly carousel from rotating with movement of the child dolly away from the parent dolly.

Figure 1:
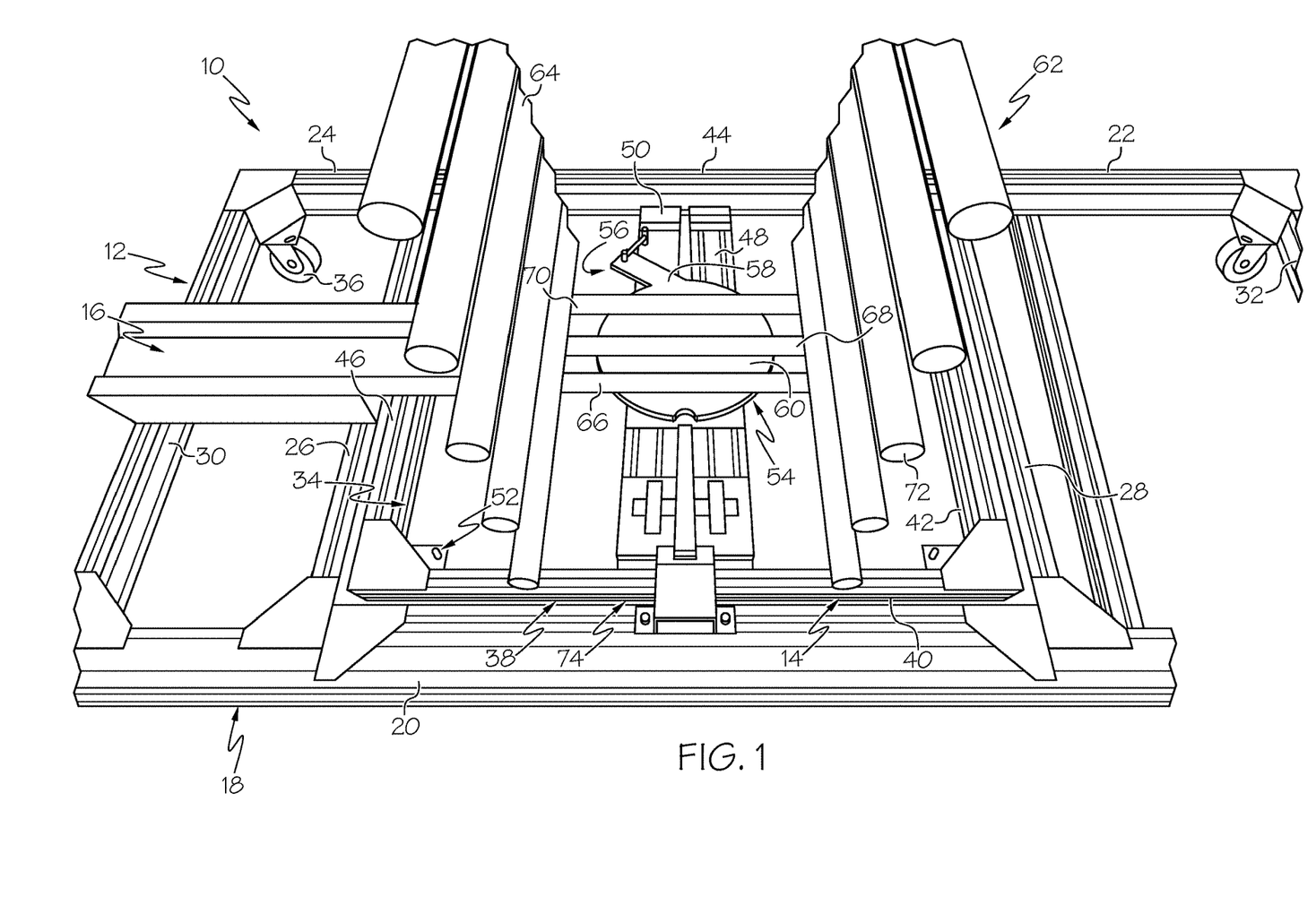
FIG. 1 is a perspective view of a dolly assembly including a locking assembly for locking a child dolly carousel, according to one or more embodiments shown and described herein.

Referring to FIG. 1, a dolly assembly 10 includes a parent dolly 12 and a child dolly 14 that is releasably coupled to the parent dolly 12. The parent dolly 12 may include coupling structure 16 that is used to couple the parent dolly 12 to a power assisted device that includes a driver (e.g., an electric motor) for moving around the dolly assembly 10. In some embodiments, the parent dolly 12 may include a coupling structure that is used to connect a series of dolly assemblies 10 together in a train for transporting the multiple dolly assemblies 10 together. The dolly assembly 10 may be moved manually and/or using the powered assisted device.

The parent dolly 12 generally includes a support frame 18 that defines a truck-receiving volume 34 and surrounds at least part of the child dolly 14. In particular, the support frame 18 includes an elongated side bar 20, a pair of shorter side bars 22 and 24, inner cross bars 26 and 28 and outer cross bars 30 and 32. The inner cross bars 26 and 28 and side bar 20 together form the somewhat U-shaped receiving volume 34 that partially surrounds the child dolly 14. Wheels 36 are provided at the bottom of the support frame 18 to facilitate movement of the parent dolly 12 and the child dolly 14 when located in the truck-receiving volume 34, as shown by FIG. 1.

The child dolly 14 includes a support frame 38 that is sized to be received within the truck-receiving volume 34. In particular, the support frame 38 includes four side bars 40, 42, 44 and 46 that together form a square or rectangular shape. One or more cross bars 48 and 50 may extend between opposite side bars 40 and 44. Wheels 52 are provided at the bottom of the support frame 38 to facilitate movement of the child dolly 14 with the parent dolly 12 and alone when separated from the parent dolly 12.

A child dolly carousel 54 is rotatably supported on the cross bars 48 and 50 at a geometric center of the support frame 38. The child dolly carousel 54 may be supported on, for example, a bearing that allows the child dolly carousel 54 to rotate relative to the support frame 38. In some embodiments, a rotation control device 56 may be provided to limit rotation of the child dolly carousel 54 in only a single direction. For example, a lever 58 may be connected to the child dolly carousel 54 that limits rotation of the child dolly carousel 54.

In the illustrated example, the child dolly carousel 54 includes a circular plate 60 that supports a rack assembly 62 thereon. The rack assembly 62 may include opposite vertical beams 64 that are connected by cross beams 66, 68 and 70. The cross beams 66, 68 and 70 may be mounted to the child dolly carousel 54 such that the rack assembly rotates with the child dolly carousel 54. Mounting rods 72 may be provided against which a component or part may be supported, such as multiple vehicle grills. The child dolly carousel 54 can be used to rotatably position the rack assembly 62 and the vehicle parts located thereon for an assembly operation when located in the truck-receiving volume 34 as will be described in greater detail below.

Figure 2:
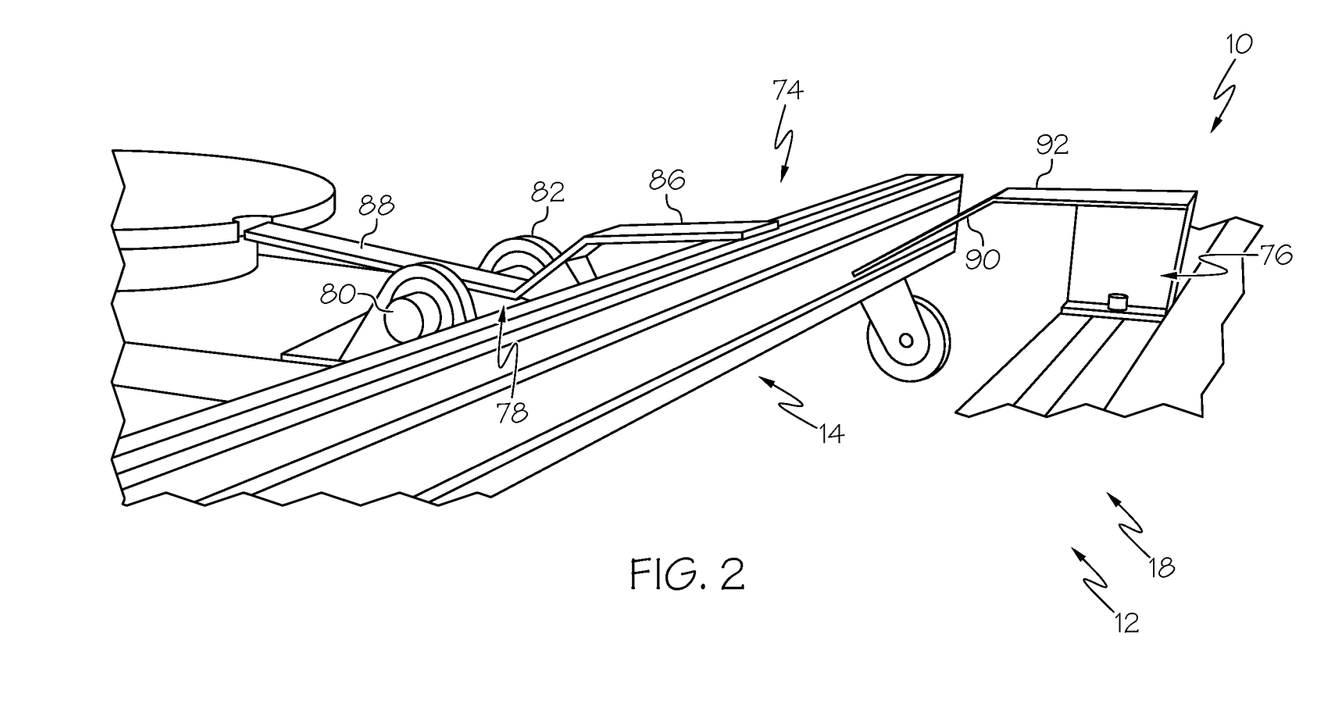
FIG. 2 is a side view of the locking assembly of FIG. 1 in a locked position, according to one or more embodiments shown and described herein.
Figure 3:
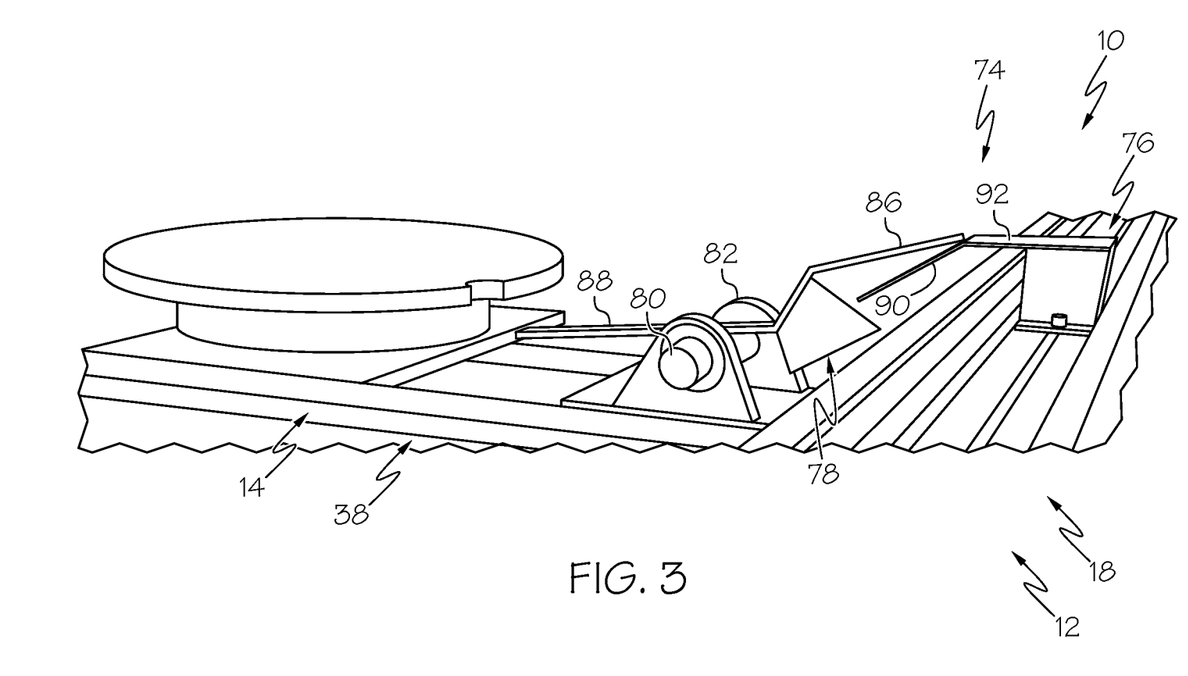
FIG. 3 is another side view of the locking assembly of FIG. 2 in an unlocked position, according to one or more embodiments shown and described herein.

Referring also to FIGS. 2 and 3, the dolly assembly 10 includes a locking assembly 74. The locking assembly 74 includes a ramp 76 that is fixedly mounted to the support frame 18 of the parent dolly 12 and a locking arm 78 that is rotatably mounted to the support frame 38 of the child dolly 14. The locking arm 78 is rotatably mounted to the support frame 38 at a pivot location 80 that is provided by a mount 82 and a pin 84 that extends through the pivot location 80. The locking arm 78 includes a contact portion 86 and an interlock portion 88. The pivot location 80 is located between the contact portion 86 and the interlock portion 88. The contact portion 86 of the locking arm 78 engages a sloped portion 90 of the ramp 76 and rides up the ramp 76 as the child dolly 14 is fully positioned within the truck-receiving volume 34. The ramp 76 further includes a flat plateau 92 where the contact portion 86 of the locking arm 78 can rest.

The locking arm 78 has both a locked position (FIG. 2) and an unlocked position (FIG. 3). The contact portion 86 may be heavier than the interlock portion 88 such that the contact portion 86 is biased downward by gravity toward the locked position. The sloped portion 90 of the ramp 76 overcomes this bias and raises the contact portion 86 thereby lowering the interlock portion 88 to the unlocked position.

Figure 4:
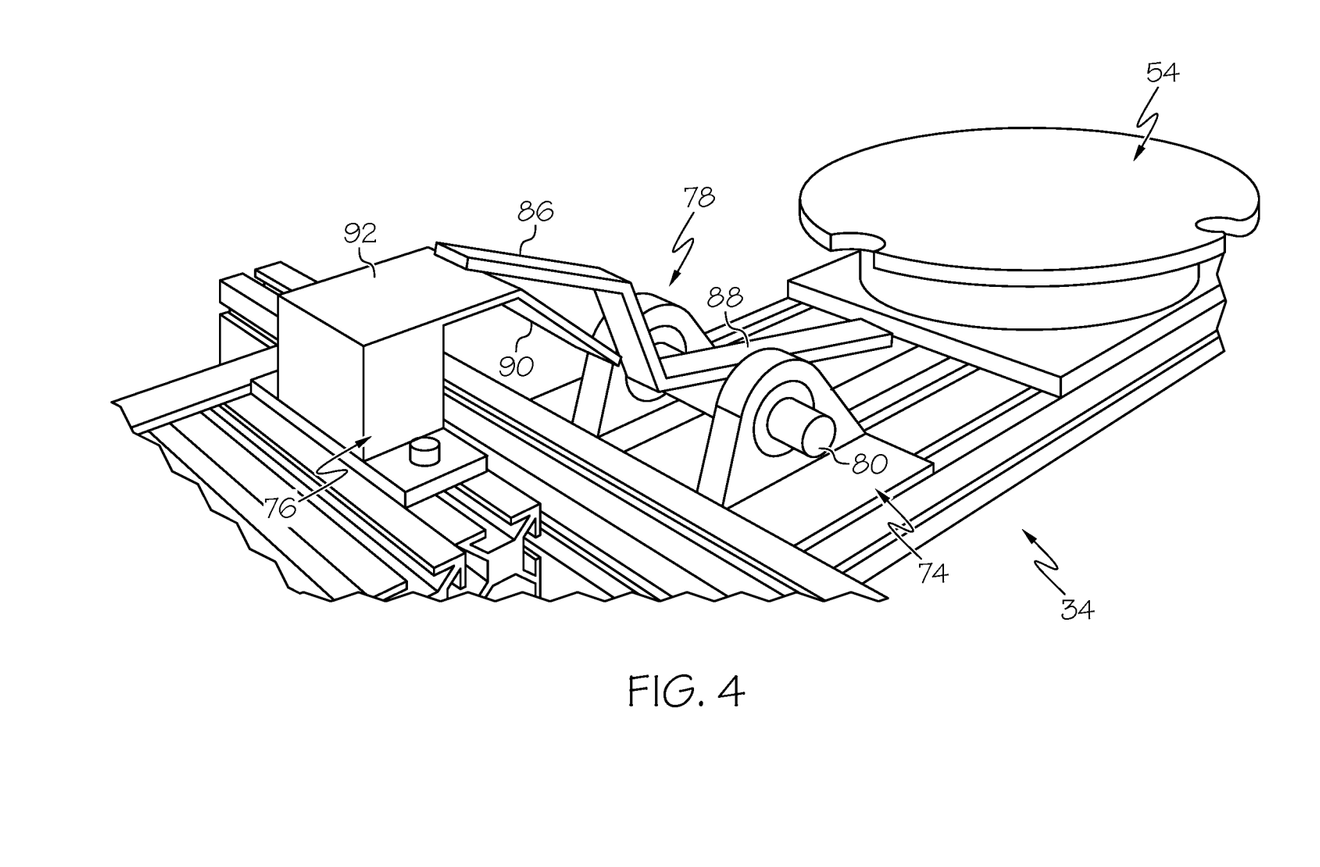
FIG. 4 is a top perspective view of the locking assembly of FIG. 1 in the unlocked position and with a rack assembly removed, according to one or more embodiments shown and described herein.
Figure 5:
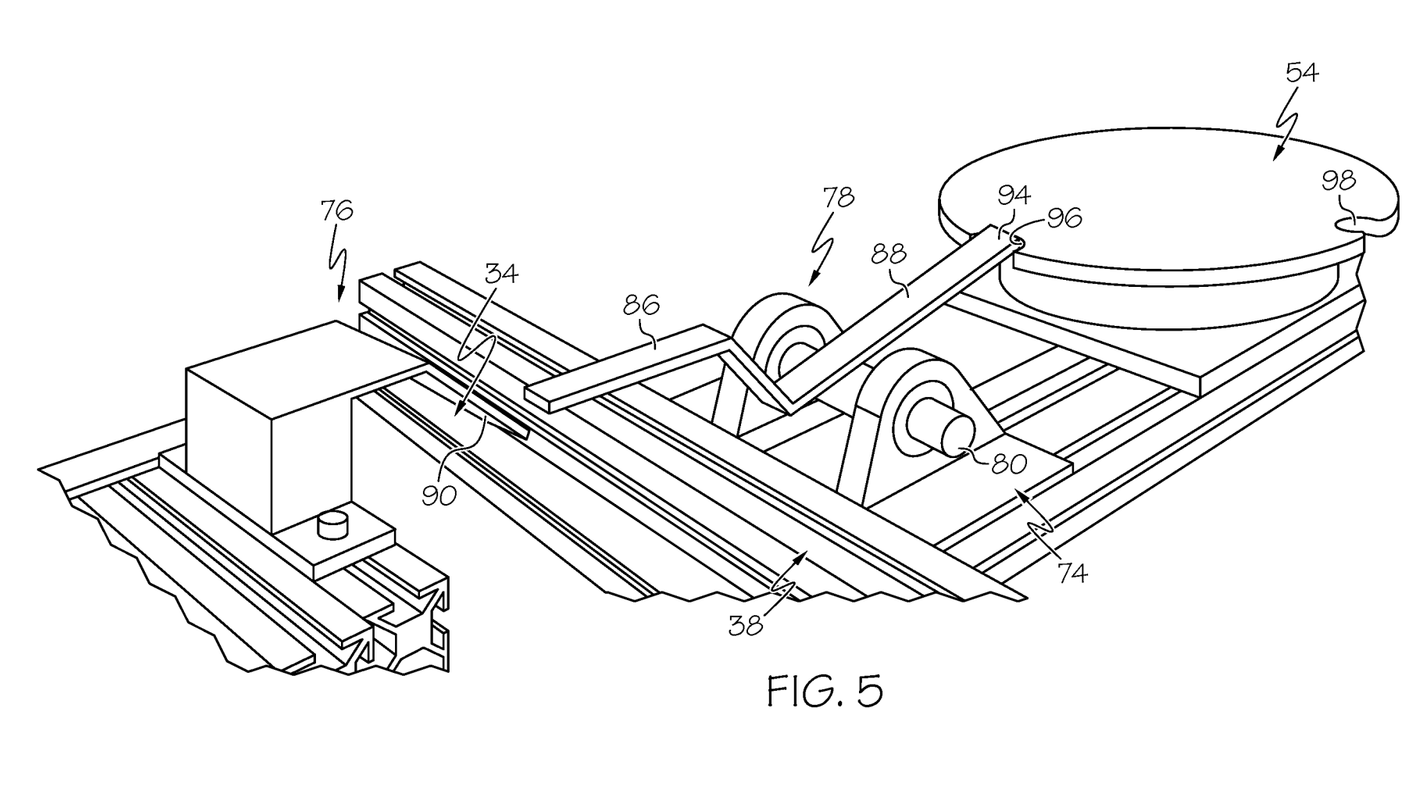
FIG. 5 is another top perspective view of the locking assembly of FIG. 4 in a locked position and with the rack assembly removed, according to one or more embodiments shown and described herein.

FIGS. 4 and 5 more clearly illustrate operation of the locking assembly 74 with the rack assembly 62 removed. Referring first to FIG. 4, the locking assembly 74 and locking arm 78 are shown in the unlocked position. In the unlocked position, the contact portion 86 of the locking arm 78 is raised and rests on the plateau 92 of the ramp 76. The interlock portion 88 is lowered such that a free end 94 of the interlock portion 88 is out of engagement with the child dolly carousel 54. As can be appreciated, moving the child dolly 14 out of the truck-receiving volume 34 causes the contact portion 86 to slide down the sloped portion 90 of the ramp 76.

Referring now to FIG. 5, the locking assembly 74 and the locking arm 78 are shown in the locked position. As mentioned above, the locking arm 78 is biased toward the locked position. This bias can be achieved by offsetting the pivot location 80 from a center of mass of the locking arm 78 toward the contact portion 86 or otherwise providing the contact portion 86 with more weight than the interlock portion 88. Thus, as the child dolly 14 is removed from the truck-receiving volume 34, the contact portion 86 of the locking arm 78 slides down the sloped portion 90 of the ramp 76 thereby raising the interlock portion 88. In the locked position, the free end 94 of the interlock portion 88 is received within a notch 96. Once located within the notch 96, the interlock portion 88 of the locking arm 78 prevents rotation of the child dolly carousel 54. In the illustrated embodiment, the child dolly carousel 54 includes a pair of notches 96 and 98 that correspond to extreme rotational positions of the child dolly carousel 54 and rack assembly 62 (FIG. 1). In the locked position, the contact portion 86 of the locking arm 78 is separated from the ramp 76 and can rest on the support frame 38. As the child dolly 14 is moved back into the truck-receiving volume 34, the contact portion 86 of the locking arm 78 again comes into contact with the sloped portion 90 of the ramp 76 and moves toward the unlocked position as described with reference to FIG. 4.

The above-described dolly assemblies include a locking assembly that can be used to lock a rotational position of a child dolly carousel to prevent rotation of the child dolly carousel when removed from a truck-receiving volume of a parent dolly. Locking the rotational position of the child dolly carousel can facilitate movement of the child dolly in and out of the truck-receiving volume and also alone while separated from the parent dolly. The locking assembly operates automatically with no external power source as the child dolly is placed within the truck-receiving volume without any need for manual interaction with the locking assembly.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A dolly assembly, comprising:
   a parent dolly comprising a support frame that defines a truck-receiving volume;
   a child dolly comprising a support frame that is sized to be received within the truck-receiving volume, the child dolly comprising a child dolly carousel;
   wherein the parent dolly and the child dolly together comprise a locking assembly comprising a locking arm that prevents rotation of the child dolly carousel in a locked position, the locking arm directly engaging the child dolly carousel in the locked position.

2. The dolly assembly of claim 1, wherein the locking assembly comprises the locking arm that is rotatably mounted to the support frame of the child dolly at a pivot location.

3. The dolly assembly of claim 2, wherein the locking arm comprises a contact portion and an interlock portion, the pivot location located between the contact portion and the interlock portion.

4. The dolly assembly of claim 3, wherein the contact portion is heavier than the interlock portion such that the locking arm is biased by gravity toward the locked position.

5. The dolly assembly of claim 4, wherein the locking assembly comprises a ramp that is mounted to the support frame of the parent dolly, the ramp located such that the contact portion of the locking arm engages a sloped portion of the ramp to raise the contact portion toward an unlocked position.

6. The dolly assembly of claim 5, wherein, in the locked position, a free end of the interlock portion engages the child dolly carousel within a notch in the child dolly carousel.

7. The dolly assembly of claim 6, wherein, in the unlocked position, the free end of the interlock portion moves away from the notch.

8. The dolly assembly of claim 1, wherein the child dolly comprises a rack assembly that is mounted upon the child dolly carousel, the rack assembly rotating along with the child dolly carousel between a first position and a second position.

9. A method of preventing rotation of a child dolly carousel of a child dolly using a locking assembly, the method comprising:
moving the child dolly out of a truck receiving volume of a parent dolly; and
as the child dolly is being removed from the truck-receiving volume, a locking arm of the locking assembly automatically engaging the child dolly carousel thereby preventing rotation of the child dolly carousel while the child dolly is removed from the truck-receiving volume;
wherein the locking assembly comprises the locking arm that is rotatably mounted to a support frame of the child dolly at a pivot location.

10. The method of claim 9, wherein the locking arm comprises a contact portion and an interlock portion, the pivot location located between the contact portion and the interlock portion.

11. The method of claim 10, wherein the contact portion is heavier than the interlock portion such that the locking arm is biased by gravity toward the a locked position.

12. The method of claim 11 further comprising moving the child dolly back into the truck-receiving volume, the locking assembly comprising a ramp that is mounted to a support frame of the parent dolly, the ramp located such that the contact portion of the locking arm engaging a sloped portion of the ramp thereby raising the contact portion toward an unlocked position as the child dolly is moved into the truck-receiving volume.

13. The method of claim 12, wherein, in the locked position, a free end of the interlock portion engaging the child dolly carousel within a notch in the child dolly carousel.

14. The method of claim 13, wherein, in the unlocked position, the free end of the interlock portion moving away from the notch.

15. The method of claim 9, wherein the child dolly comprises a rack assembly that is mounted upon the child dolly carousel.

16. The method of claim 15 further comprising rotating the rack assembly along with the child dolly carousel between a first position and a second position.

\* \* \* \* \*

UNITED STATES PATENT AND TRADEMARK OFFICE
CERTIFICATE OF CORRECTION

| | | |
|---|---|---|
| PATENT NO. | : 11,787,456 B2 | |
| APPLICATION NO. | : 17/330830 | |
| DATED | : October 17, 2023 | |
| INVENTOR(S) | : Ethan R. Boggs | |

It is certified that error appears in the above-identified patent and that said Letters Patent is hereby corrected as shown below:

In the Claims

In Column 6, Line(s) 14, Claim 11, after "toward", delete "the".

Signed and Sealed this
Twenty-eighth Day of November, 2023

*Katherine Kelly Vidal*

Katherine Kelly Vidal
*Director of the United States Patent and Trademark Office*